July 18, 1972   R. W. STERRETT ET AL   3,677,874

INSULATION PRODUCT AND METHOD

Original Filed Jan. 20, 1967

United States Patent Office 3,677,874
Patented July 18, 1972

3,677,874
INSULATION PRODUCT AND METHOD
Robert W. Sterrett, Wayland, Mass., and Francis J. Jacob, New Castle, Pa., assignors to W. R. Grace & Co., New York, N.Y.
Original application Jan. 20, 1967, Ser. No. 610,524. Divided and this application Mar. 24, 1970, Ser. No. 22,197
Int. Cl. B32b 3/00, 3/26, 5/14
U.S. Cl. 161—116
4 Claims

ABSTRACT OF THE DISCLOSURE

An insulation board is made by laminating to the surface of a body of foamed plastic resin, such as foamed polystyrene, a film of higher density foamed plastic resin such as foamed polystyrene.

---

This application is a division of application Ser. No. 610,524, filed Jan. 20, 1967, now abandoned.

This invention relates to a laminated insulation board and to a process of making it. More particularly, this invention concerns a laminated foamed thermoplastic resin insulation board suitable for use in built-up roofing and to a heat-laminating process for making it.

In the present invention, a novel insulating board is provided by heat-laminating, to a core of foamed thermoplastic resin such as foamed polystyrene, a surface film of foamed thermoplastic resin such as foamed polystyrene of lower density than the foamed resin core. The film can be embossed to provide a decorative finish as well as other desirable effects. The board is particularly useful as a roof deck material in built-up roofs as will become apparent from the following detailed description and drawings wherein.

Figure 1:
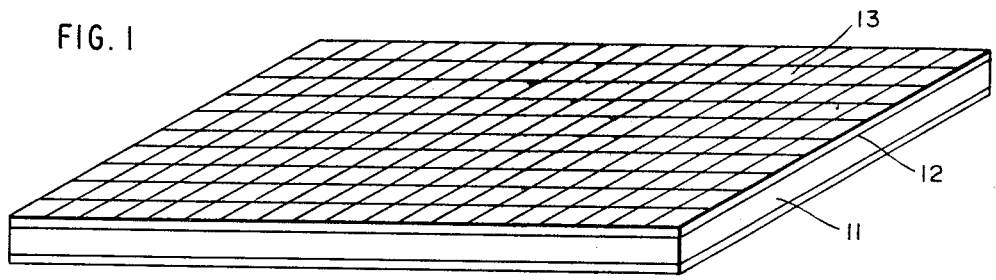
FIG. 1 is an isometric view of a foamed polystrene board of this invention having a foamed polystyrene film bonded thereto wherein the film is embossed.

Referring now to FIG. 1, there is shown a polystyrene board 11 laminated with a polystyrene film 12. Here a thin, foamed polystyrene film 12 is bonded to a lower density foam polystyrene board 11. Both components of this board are chemically identical but differ in weight, thickness and physical form. For example, a one-inch thick, one pound per cubic foot polystyrene board can be laminated with a 0.020 inch thick 6–7 pound per cubic foot polystyrene, film. The resulting laminated board exhibits quite different physical properties than the unlaminated board. It has a harder, more uniform surface, and a higher surface heat capacity. The higher heat capacity of the laminate makes thermal adhesion of subsequent material (such as saturated felt roofing sheets) more practical than with the unlaminated board. The laminated surface is also more receptive to adhesive bonding of membranes of any type.

The uniform laminated surface can also be embossed. Embossing 13 in FIG. 1, produces attractive finishes. It also produces an unexpected improvement when heat is used to bond other materials to the embossed surface. Any heat bonding system used requires a controlled application of heat. The heat must be adequate to either activate a thermal set adhesive, to soften a thermal plastic adhesive or to fuse the foamed polystyrene if no other adhesive system is used. However, if too much heat is applied the polystyrene surface will collapse. If the surface is embossed the range of heat necessary to produce satisfactory adhesion is greatly broadened.

It is thought that this improvement results from the fact that the portion of the surface depressed (by the embossing operation) receives heat at a much lower rate and is also not in direct contact with the material being applied. The thin channel of air separating it from the laminate delays the passage of heat to the depressed surface. If the heat applied is adequate to collapse the portion of the surface which is in thermal contact, the depressed portion (which receives heat at a lower rate) will provide a firm support limiting the collapse to the depth of the embossing. This characteristic is particularly important in preparing built-up roofing where a hot bituminous coated roofing felt is applied to the polystyrene board. Hot pitch or asphalt is normally mopped on the uncoated roofing felt after the coated side has been put in contact with polystyrene. Such an operation has many variations such as weather conditions, temperature of the materials, rate of mopping, etc. The board range of acceptable heat exposure obtained with embossing reduces job problems and insures good adhesion.

Figure 2:
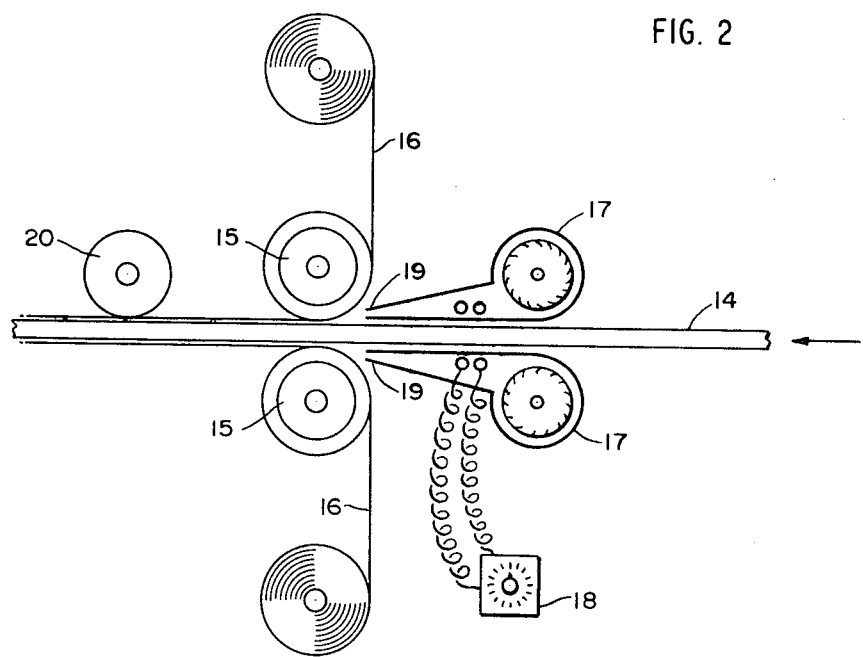
FIG. 2 is a schematic view of the apparatus used to make the polystyrene boards of this invention.

Referring now to FIG. 2 there is depicted a process for preparing the board described in FIG. 1. In this process a polystyrene board 14 is continuously fed between two rollers 15—15 where a polystyrene laminate 16—16 is applied to both sides of the board 14. The laminate 16—16 is bonded to the board 14 by the application of heat and pressure. The heat is in the form of heated air which is supplied from a heat gun 17—17. The temperature of the heated air is thermostatically controlled by a controller 18. The output ends of the heat guns are tapered to narrow slots 19—19 so that the heated air can be concentrated at the desired bonding point, which is the apex of the angle formed by the film 16 and the board 14. The heated air from the heat guns 17—17 as it emerges from the slits 19—19 is at a temperature of about 1000° F. The temperature of the laminate at the point of bonding is approximately 200° F. The rate of throughput of the polystyrene board 14 is approximately 300 ft. per minute and the pressures of the rollers 15—15 is on the order of 5 to 8 pounds per square foot. The polystyrene board 14 thickness is not critical. However, it has been found that the desired thickness of the laminate 16—16 is on the order of 20 to 100 mils. Thicknesses of the laminate 16—16 lower than 20 mils are adversely effected by the temperature conditions of the process. Embossing of the laminated board is accomplished by the patterned roll 20.

It is within the scope of the present invention to use other foamable plastic materials such as polyurethane for the extruded board and film. The invention has been described using polystyrene as the preferred material.

What is claimed is:

1. An insulated building structure comprising a building support structure and a laminated insulation board supported thereby, said board comprising a core of foamed thermoplastic resin selected from the group consisting of polystyrene and polyurethane having bonded to at least one face thereof a film of foamed thermoplastic resin selected from the group consisting of polystyrene and polyurethane, said foamed thermoplastic resin film having a density which is higher than the density of said foamed thermoplastic resin core.

2. The structure of claim 1 wherein said core and said film are foamed polystyrene.

3. The board of claim 1 wherein the exposed surface of said film has a predetermined embossed pattern.

4. An insulated built-up roof structure comprising,
 (A) a roof deck material which comprises a laminated insulation board comprising a core of foamed thermoplastic resin selected from the group consisting of polystyrene and polyurethane having bonded to at least one face thereof a film of foamed thermoplastic resin selected from the group consisting of polystyrene and polyurethane, said foamed thermoplastic resin film having a density which is higher than the density of said foamed thermoplastic resin core; and (B) a sheet of roofing felt above said foamed thermoplastic film.

References Cited

UNITED STATES PATENTS

| | | | |
|---|---|---|---|
| 3,565,746 | 2/1971 | Stevens | 161—160 |
| 3,463,687 | 8/1969 | Folsom et al. | 264—45 |
| 3,054,146 | 9/1962 | Griffin | 161—164 |
| 3,104,192 | 9/1963 | Hacklander | 161—159 |
| 3,492,196 | 1/1970 | Moore | 161—160 |
| 3,213,071 | 10/1965 | Campbell | 161—161 |
| 3,396,062 | 8/1968 | White | 161—160 |

FOREIGN PATENTS

| | | | |
|---|---|---|---|
| 974,809 | 11/1964 | Great Britain | 161—159 |

WILLIAM J. VAN BALEN, Primary Examiner

U.S. Cl. X.R.

52—309; 156—306; 161—159, 160, 161, 165, 166, 190, 236, 252